UNITED STATES PATENT OFFICE.

CARL BOSCH, ALWIN MITTASCH, AND CHRISTOPH BECK, OF LUDWIGSHAFEN-ON-THE-RHINE, GERMANY, ASSIGNORS, BY MESNE ASSIGNMENTS, TO THE CHEMICAL FOUNDATION, INC., A CORPORATION OF DELAWARE.

PRODUCING HYDROGEN.

1,330,772.  Specification of Letters Patent.  Patented Feb. 10, 1920.

No Drawing.  Application filed June 4, 1914. Serial No. 842,954.

*To all whom it may concern:*

Be it known that we, CARL BOSCH, ALWIN MITTASCH, and CHRISTOPH BECK, citizens of the German Empire, residing at Ludwigshafen-on-the-Rhine, Germany, have invented new and useful Improvements in Producing Hydrogen, of which the following is a specification.

It is known that on passing a mixture containing carbon monoxid and steam with, or without, other gases over catalytic agents, reaction takes place resulting in the production of carbon dioxid and hydrogen. In our researches on the production of hydrogen from carbon monoxid and steam, we have discovered that the power of catalytic agents generally for the said production of hydrogen from carbon monoxid and steam can be improved by the presence of certain bodies which we have termed promoters. We have found, for instance, that the activity of the catalytic agents, especially those consisting of, or containing iron, nickel or cobalt, or oxids thereof, and also of other catalytic metals, or oxids even such as by themselves are less active, can be greatly increased by the addition of certain compounds, or bodies, to which as aforesaid we have given the name promoters. Thus, the activity of catalytic agents consisting of, or containng iron, nickel or cobalt, or oxids thereof can be greatly increased by the addition of oxygen-compounds of chromium, thorium, uranium, beryllium, antimony or other oxids. Further, a catalytic agent consisting of, or containing iron in admixture with less than its weight of nickel, particularly after working for a long time, yields better results than does either iron or nickel when employed by themselves. It is also sometimes possible to promote the activity of a catalytic agent containing a certain metal by the addition of a compound such, for instance, as the hydroxid or a salt of the same metal. Thus, for instance, iron oxid which for any reason is less active, can be made to yield better results by applying to it a layer of finely divided iron oxid prepared and employed at a comparatively low temperature. In many cases, however, particularly when using catalysts of weak activity, we prefer to employ as promotor a compound which differs considerably from the catalytic agent, in particular with respect to valency, chemical basicity and capability of reduction. In this way mixtures of zinc, lead, copper, vanadium, manganese or titanium with a promoter can be obtained, which even at low temperatures, possess an excellent activity for the conversion of carbon monoxid and steam into carbon dioxid and hydrogen. Our invention, however, is not limited to the use of any of the particular compounds above mentioned since other compounds, or bodies, which will act in the same, or a similar way may be employed. By carrying out the following two experiments side by side, it is easy to determine whether, or not, a given compound or body promotes the activity of the catalytic agent. In the one case pass a given mixture of gases containing carbon monoxid and steam, over the catalytic agent without any addition thereto, and in the other case pass a like mixture of gases over a mixture of the catalytic agent with the compound, or body, to be tested. If in the second case, a better conversion be obtained than was obtained in the first case, then the said compound, or body, can be regarded as one which increases the activity of the catalytic agent, and is covered by the term promoter. With such contact masses, employed according to this invention, a practically complete conversion can be obtained at comparatively very low temperatures and while imparting to the gases a great velocity. However, the contact masses can also be employed advantageously at a higher temperature, although we prefer, during the production and employment of our contact masses, not to exceed a temperature of about 600° C., at any rate for any considerable length of time.

According to this invention, the catalytic agents can be employed either singly, or in admixture with one another, or with other bodies and also either one, or more than one, of the compounds, or bodies, promoting the activity, can be added to the catalytic agent. It is preferred to employ the contact mass in a finely divided state, for instance, in the state of fine powder or in fine porous condition, preferably in the form of lumps in the production of which binding agents have been employed. If desired, carriers can be made use of. In order to obtain an intimate mixture of the constituents, salts, for instance, nitrates, can be mixed together, or a mixture of the hydroxids may be taken, and, if necessary, the mixture can be calcined while preferably avoiding too high a temperature. During the production any other suitable compound may be present. The proportion of the catalytic agent to the compound, or body, which enhances its activity can be varied within wide limits, and sometimes the addition of only small quantities of the promoting compound, or body, may produce good, or even the best, results.

The contact masses according to this invention can be employed for the conversion of any suitable gases containing carbon monoxid. The said contact masses are also of great value in cases in which it is desired to remove small quantities of carbon monoxid from gases containing hydrogen and, consequently, when starting from gas mixtures rich in carbon monoxid, if desired, the greater quantity of carbon monoxid can be removed or catalytically converted into carbon dioxid in any other suitable manner. The contact masses containing iron as the catalytic agent and a smaller quantity of nickel as above described as promoter, bring about rapid and far-reaching conversion without the simultaneous formation of methane, even when comparatively very low temperature is employed and, as compared with pure nickel, are further characterized, (especially when suitable oxids, or oxy-compounds are employed as binding agents or as promoters) by possessing greater stability and less sensitiveness to deleterious influences, such as for instance, fortuitous increases of temperature and impurities in the gas mixture.

During the use of the catalytic mixtures according to this invention, both catalytic agent and promoter may undergo changes, for instance, oxidation, reduction, or combination with one another but such changes do not constitute any departure from this invention.

In some cases it may happen that two bodies each for itself possess only a small catalytic activity, but when mixed together influence one another, so that a catalytic mixture of good activity is obtained. In this case, it is of course difficult to say which of the bodies promotes the activity of the other, but we wish to be understood as claiming the use of these catalytic mixtures.

It occurs in some cases that the non-metallic elements chlorin, boron and silicon—in some forms—may lower the activity of the catalyst improved by the promoter. In such cases means must be taken to exclude these bodies.

The following examples will serve to illustrate further the nature of this invention, but the invention, however, is not confined to these examples. The parts are by weight.

*Example 1.*

Dissolve 85 parts of pure ferric nitrate and 15 parts of pure chromium nitrate in water and then precipitate the hydroxids by means of ammonia, filter them off, press into suitable shapes and introduce these into the contact furnace. On passing a mixture of steam and carbon monoxid over the mass, a very rapid and complete conversion takes place even at temperatures of from 400° to 450° C.

In a similar manner contact masses which contain also other constituents, can be prepared and employed, for instance, 20 parts of aluminium nitrate can be added to the mixture of nitrates employed according to the foregoing example. A very suitable mixture can also be obtained by mixing together 194 parts of ferric nitrate, 5 parts of ammonium chromate and 1 part of thorium nitrate and heating the mixture until the oxids are obtained, and employing the product in the contact furnace.

*Example 2.*

Dissolve in water a mixture of 40 parts of ferric nitrate, 5 parts of nickel nitrate and 5 parts of chromium nitrate (all free from chlorin), precipitate the solution by means of potassium carbonate, filter and wash the precipitate well and then form the mass into suitable shapes, and dry and pass a mixture of water gas and steam over the contact mass at a temperature of, for instance, 400° to 500° C. The quantity of nickel can be increased or decreased, for instance, instead of 5 parts of nickel nitrate, as much as 10 parts, or as little as 3 parts, can be employed.

If desired, the greater quantity of carbon monoxid can first be removed from the gases by means of any other suitable catalytic agent at a temperature, for instance, of from 500° to 600° C., and then the gases while hot can be passed over the contact mass according to this invention, at a temperature of, for instance, from 350° to 400° C. this being done, if desired, after removing sulfureted hydrogen, or other undesirable compounds, by means of copper or other suitable agent, and also, if necessary, after adding a further quantity of steam.

*Example 3.*

Break up spathic iron ore into grains, roast them, add a small quantity of dilute nitric acid and heat gently, so that the ferric nitrate which is first formed is converted into a layer of oxid. Instead of nitric acid, iron nitrate itself can be used in order to form the promoting body, and further, other promoters can be added, for instance, in the form of chromium nitrate The spathic iron ore, either with or without being roasted can be treated in the form of powder and, if desired, binding agents may be employed. Further, other iron ores may be treated in a similar manner, although the presence of much sulfur, phosphorus and silicium should be avoided.

*Example 4.*

Take iron oxid which during its production has been raised to a high temperature, add about one third of its weight of moist ferric hydroxid, knead the mixture, form it into lumps, dry and fill it into the contact furnace.

*Example 5.*

Take fine-meshed iron wire netting, for for instance, in the form of small rolls, and heat it one or more times with a concentrated solution of ferric nitrate, employing about 1 part of ferric nitrate for 2 parts of iron wire, and then heat moderately until any nitrate which may be present is completely decomposed. Other compounds having a favorable action may be added to the ferric nitrate, for instance, the nitrates of chromium, nickel, or aluminium.

The catalytic mixtures obtainable according to either of the foregoing examples 3, 4 and 5 possess considerably greater activity than does the initial material in each case.

*Example 6.*

Mix zinc oxid with twice its weight of chromium nitrate and heat the mixture while stirring until the nitrate is decomposed. Then place the granulated product into the contact furnace and pass a mixture of water gas and steam through the furnace at between 400° and 600° C. whereupon a good conversion is obtained.

Another method of preparing the catalytic mixture may consist in precipitating chromium nitrate or chromium acetate with ammonia, mixing the hydroxid with precipitated zinc oxid, shaping the mass and drying it. Good results are also obtained when beryllium oxid is employed as promoter.

*Example 7.*

Dissolve in water 3 parts of lead nitrate, or lead acetate and 1 part of uranium nitrate, precipitate with ammonia, filter, form the damp precipitate into lumps, heat them and employ them as described in the foregoing example 6.

*Example 8.*

Dissolve a mixture of 2 parts of copper nitrate and 1 part of zirconium nitrate in water, warm the solution and add sodium carbonate or potassium carbonate, filter, wash out the alkali salt partly or completely. Mold the mass and dry it and employ it as described in the foregoing example 6.

As examples of other active catalytic mixtures, we mention those containing the oxids of manganese and chromium, or titanium and antimony, or vanadium and chromium, or chromium and thorium.

In many cases it is advisable to add other materials such as alumina or small quantities of alkali carbonates to act as binding agents or promoters.

*Example 9.*

Dissolve 3 parts of cerium nitrate and 1 part of chromium nitrate in water and precipitate while hot with ammonia. Filter off, completely dry a part and mix it with the other moist part, so that a paste of the required consistency is produced; bring this into suitable shapes, dry and pass a mixture of steam and water gas over it at 450–550° C.

Instead of cerium nitrate, other rare earth salts, giving rise to oxygen compounds of the said metals, can be used.

Now what we claim is:—

1. The process of manufacturing hydrogen by passing a mixture containing carbon monoxid and steam over an active catalyst containing at least one oxid of a metal of the iron group and at least one of the oxygen compounds of chromium, thorium, uranium, beryllium or antimony.

2. The process of manufacturing hydrogen by passing a mixture containing carbon monoxid and steam over an active catalyst containing an oxid of iron and chromium oxid.

3. The process of manufacturing hydrogen by passing a mixture containing carbon monoxid and steam over an active catalyst containing the oxids of iron and chromium and nickel, but more iron than the total quantity of nickel and chromium.

In testimony whereof we have hereunto set our hands in the presence of two subscribing witnesses.

CARL BOSCH.
ALWIN MITTASCH.
CHRISTOPH BECK.

Witnesses:
CH. SCHNEIDER,
J. ALEC. LLOYD.